United States Patent [19]
Tanaka

[11] Patent Number: 5,845,212
[45] Date of Patent: Dec. 1, 1998

[54] OPTIMUM POWER AND HANDOVER CONTROL BY CELLULAR SYSTEM MOBILE UNIT

[75] Inventor: Shoji Tanaka, Tokyo, Japan

[73] Assignee: NEC Corporation, Tokyo, Japan

[21] Appl. No.: 726,360

[22] Filed: Oct. 4, 1996

[30] Foreign Application Priority Data

Oct. 11, 1995 [JP] Japan ................................ 7-262929

[51] Int. Cl.$^6$ .............................. H04B 7/26; H04Q 7/34
[52] U.S. Cl. ........................................... 455/437; 455/522
[58] Field of Search ................................ 455/437, 436, 455/69, 522, 13.4, 126, 70, 127

[56] References Cited

U.S. PATENT DOCUMENTS

| | | | |
|---|---|---|---|
| 4,613,990 | 9/1986 | Halpern | 455/436 |
| 5,491,717 | 2/1996 | Hall | 455/436 |
| 5,491,837 | 2/1996 | Haartsen | 455/437 |
| 5,513,246 | 4/1996 | Jonsson et al. | 455/437 |
| 5,579,373 | 11/1996 | Jang | 455/436 |
| 5,634,195 | 5/1997 | Sawyer | 455/127 |
| 5,678,185 | 10/1997 | Chia | 455/437 |
| 5,697,056 | 12/1997 | Tayloe | 455/13.4 |
| 5,768,684 | 6/1998 | Grubb et al. | 455/13.4 |

*Primary Examiner*—Nguyen Vo
*Assistant Examiner*—Lester G. Kincaid
*Attorney, Agent, or Firm*—Young & Thompson

[57] ABSTRACT

A mobile communication system of a cellular type has in each cell a base station (12a–12c) for carrying out bidirectional communication between the base station and a mobile station (11). The base station announces a transmission power of the base station and up link reception power and up link signal quality as information to the mobile station. The mobile station judges whether nor not it is necessary to carry out a hand-over control in accordance with the information and a predetermined hand-over control information. The mobile station judges whether or not it is necessary to carry out said hand-over control in accordance with a down link received signal strength indicator, a down link received signal quality, and the predetermined hand-over control information. The mobile station may judge whether or not it is necessary for the base station to carry out a base transmission power control in accordance with the information and a base maximum transmission power. Furthermore the mobile station may judge whether or not it is necessary for the mobile station to carry out a mobile transmission power control in accordance with the information and a mobile maximum transmission power.

13 Claims, 7 Drawing Sheets

SYSTEM INFORMATION DATA

| NUMBER | INFORMATION DATA |
|---|---|
| 1 | CONTROL CHANNEL FREQUENCY |
| 2 | BASE MAXIMUM POWER |
| 3 | MOBILE MAXIMUM POWER |
| 4 | 1ST DOWNLINK HANDOVER LEVEL |
| 5 | 2ND DOWNLINK HANDOVER LEVEL |
| 6 | DOWNLINK OPTIMUM RSSI & RANGE |
| 7 | DOWNLINK MINIMUM RSSI |
| 8 | 1ST UPLINK HANDOVER LEVEL |
| 9 | 2ND UPLINK HANDOVER LEVEL |
| 10 | UPLINK OPTIMUM RSSI & RANGE |
| 11 | NUMBER OF IDLE CHANNELS |

FIG. 7

OPTIMUM POWER AND HANDOVER CONTROL BY CELLULAR SYSTEM MOBILE UNIT

BACKGROUND OF THE INVENTION

This invention relates to a mobile communication system having a service area divided into a plurality of cells.

For a larger-capacity mobile communication system, such as a mobile telephone network system, a service area is composed of a plurality of radio zones each of which will be called a cell. A base station is located in each of the cells and carries out a bidirectional communication with a mobile station by up and down link channels. The up link channel is for use in communication from the mobile station to the base station. The up link channel carries an up link signal. The down link channel is for use in communication from the base station to the mobile station. The down link channel carries a down link signal.

On carrying out the bidirectional communication, each of the base and the mobile stations may carry out a transmission power control in order to effectively carry out the bidirectional communication. Such a transmission power control is disclosed in TIA/EIA INTERIM STANDARD 136 (TIA/EIA/IS-136) published by Telcommunication Industry Association. On carrying out the transmission power control, the base station measures a received signal strength indicator of the up link signal to obtain an up link received signal strength indicator (RSSI) value. The base station controls a transmission power of the base station in accordance with the up link RSSI value. Namely, the base station carries out the transmission power control of the base station in accordance with the up link signal. The transmission power control of the base station may be called a base transmission power control. Furthermore, the base station commands the mobile station to indicate the transmission power of the mobile station as a mobile transmission power.

When the mobile station moves from one cell to another cell, it is necessary to carry out a hand-over control. On carrying out the hand-over control, the mobile station carries the hand-over control on the basis of the down link signal. Similarly, the base station carries the hand-over controls on the basis of the up link signal. The hand-over control of the mobile station may be called a mobile hand-over control. The hand-over control of the base station may be called a base hand-over control.

By the way, the base station does not carry out the base transmission power control in synchronism with the mobile hand-over control. As a result, the base transmission power may not become a maximum power on carrying out the mobile hand-over control. In the case where the base station makes the transmission power become the maximum power, it may be unnecessary to carry out the mobile hand-over control.

However, the mobile station carries out the mobile hand-over control inasmuch as the base transmission power control does not synchronize with the mobile hand-over control. Therefore, it is difficult to effectively carry out the hand-over control.

SUMMARY OF THE INVENTION

It is therefore an object of this invention to provide a mobile communication system capable of effectively carrying out a hand-over control.

Other objects of this invention will become clear as the description proceeds.

On describing the gist of this invention, it is possible to understand that a mobile communication system of a cellular type has a service area divided into a plurality of cells and comprises in each of the cells a base station for carrying out bidirectional communication between the base station and the a mobile station. The base station transmits a base transmission signal to the mobile station by a base transmission power on the bidirectional communication. The mobile station transmits a mobile transmission signal to the base station by a mobile transmission power on the bidirectional communication.

According to this invention, the base station comprises first measuring means for measuring a received power and a received signal quality in accordance with the mobile transmission signal to produce first measured information, first announcing means for announcing the first measured information and the base transmission power as base announcement information to the mobile station, first receiving means for receiving mobile announcement information from the mobile station, and first control means for controlling the base transmission power in accordance with the mobile announcement information. The mobile station comprises second measuring means for measuring a received signal strength indicator and a received signal quality in accordance with the base transmission signal to produce second measured information, second receiving means for receiving the base announcement information from the base station, hand-over means for carrying out a hand-over control in accordance with the second measured information, the base transmission power, and a predetermined hand-over control information, the hand-over means carrying out the hand-over control in accordance with the first measured information and the predetermined hand-over control information, first judging means for judging whether or not it is necessary for the base station to carry out a base transmission power control in accordance with the second measured information, the base transmission power and a base maximum transmission power to produce a base power control signal when is necessary for the base station to carry out a base transmission power control, second judging means for judging whether or not it is necessary for the mobile station to carry out a mobile transmission power control in accordance with a mobile transmission power, the first measured information, and a mobile maximum transmission power to produce a mobile power control signal when is necessary for the mobile station carries out a base transmission power control, second announcing means for announcing the first measured information as mobile announcement information to the base station, and second control means for controlling the mobile transmission power in accordance with the mobile power control signal.

BRIEF DESCRIPTION OF THE DRAWINGS

FIG. 7 is a listing of system data transmitted from a base station.

DESCRIPTION OF THE PREFERRED EMBODIMENT

Figure 1:
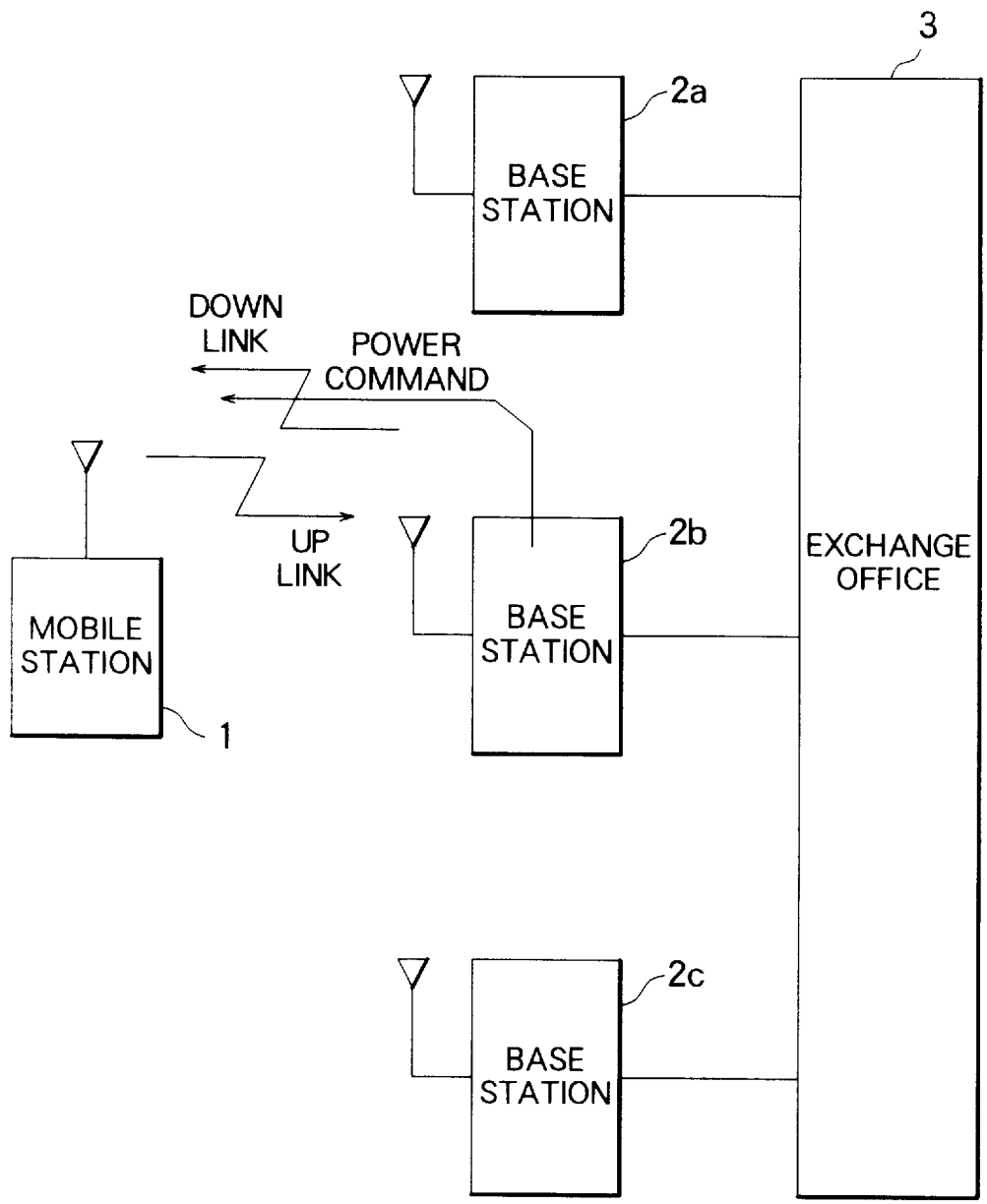
FIG. 1 is a block diagram for describing a transmission power control and a hand-over control in a conventional mobile communication system.

Referring to FIG. 1, description will made as regards a conventional mobile communication system for a better understanding of this invention. The illustrated mobile communication system has a service area. Inasmuch as the mobile communication system is of the cellular type, the service area is divided into a plurality of cells.

The mobile communication system comprises a plurality of base stations, such as first through third base stations 2a to 2c. The first through the third base stations 2a to 2c are individually situated in the cells as cell sites. Each of the first through the third base stations 2a to 2c has an omnidirectional antenna. Each of the first through the third base stations 2a to 2c is connected to a switching or exchange office 3 of a mobile communication system which is connected to a public switched telephone network (PSTN).

A plurality of mobile stations are movable in the service area although only a mobile station 1 is illustrated in FIG. 1. The mobile station 1 may be standstill in one of the cells and may move from one of the cells to another cell. In the example being illustrated, the mobile station 1 is currently presented in the cell in which the second base station 2b is situated.

The base station 2b communicates with the mobile station 1 by up link and down link channels. The up link channel is for use in transmission from the mobile station 1 to the base station 2b. The mobile station 1 transmits a mobile transmission signal as an up link signal to the base station 2b by a mobile transmission power. The down link channel is for use in transmission from the base station 2b to the mobile station 1. The base station 2b transmits a base transmission signal as a down link signal to the mobile station 1 by a base transmission power.

On communicating with the base station 2b, the mobile station 1 receives the down link signal as a base received signal to measure a received signal strength indicator (received field intensity) and a received signal quality in accordance with the base received signal. The received signal strength indicator and the received signal quality of the base received signal will be collectively called base or down link signal information. On the basis of the second measured information, the mobile station 1 determines whether or not it is necessary to carry out a hand-over control. The hand-over control carried out by the mobile station will be called a mobile hand-over control.

On the other hand, the base station 2b receives the up link signal as a mobile received signal to measure a received signal strength indicator and a received signal quality in accordance with the mobile received signal. The received signal strength indicator and the received signal quality of the mobile received signal will be collectively called mobile or up link signal information. On the basis of the first measured information, the base station 2b determines whether or not it is necessary to carry out a hand-over control. The hand-over control carried out by each base station will be called a base hand-over control. Furthermore, the base station 2b controls the base transmission power to vary the base transmission power in accordance with the first measured information. The base station 2b transmits a power command to the mobile station 1. The power command is representative of a transmission power of the mobile station 1. The mobile station 1 controls the mobile transmission power in accordance with the power command.

As readily understood from the above description, the base station 2b carries out a base transmission power control in no synchronism with the mobile hand-over control. As a result, the base transmission power may not become a maximum power when the mobile station 1 carries out the mobile hand-over control. In case where the base station 2b makes the base transmission power become the maximum power, it may be unnecessary to carry out the mobile hand-over control.

However, the mobile station 1 carries out the mobile hand-over control inasmuch as the base transmission power control does not synchronize with the mobile hand-over control. Accordingly, it is difficult to effectively carry out the hand-over control.

Figure 2:
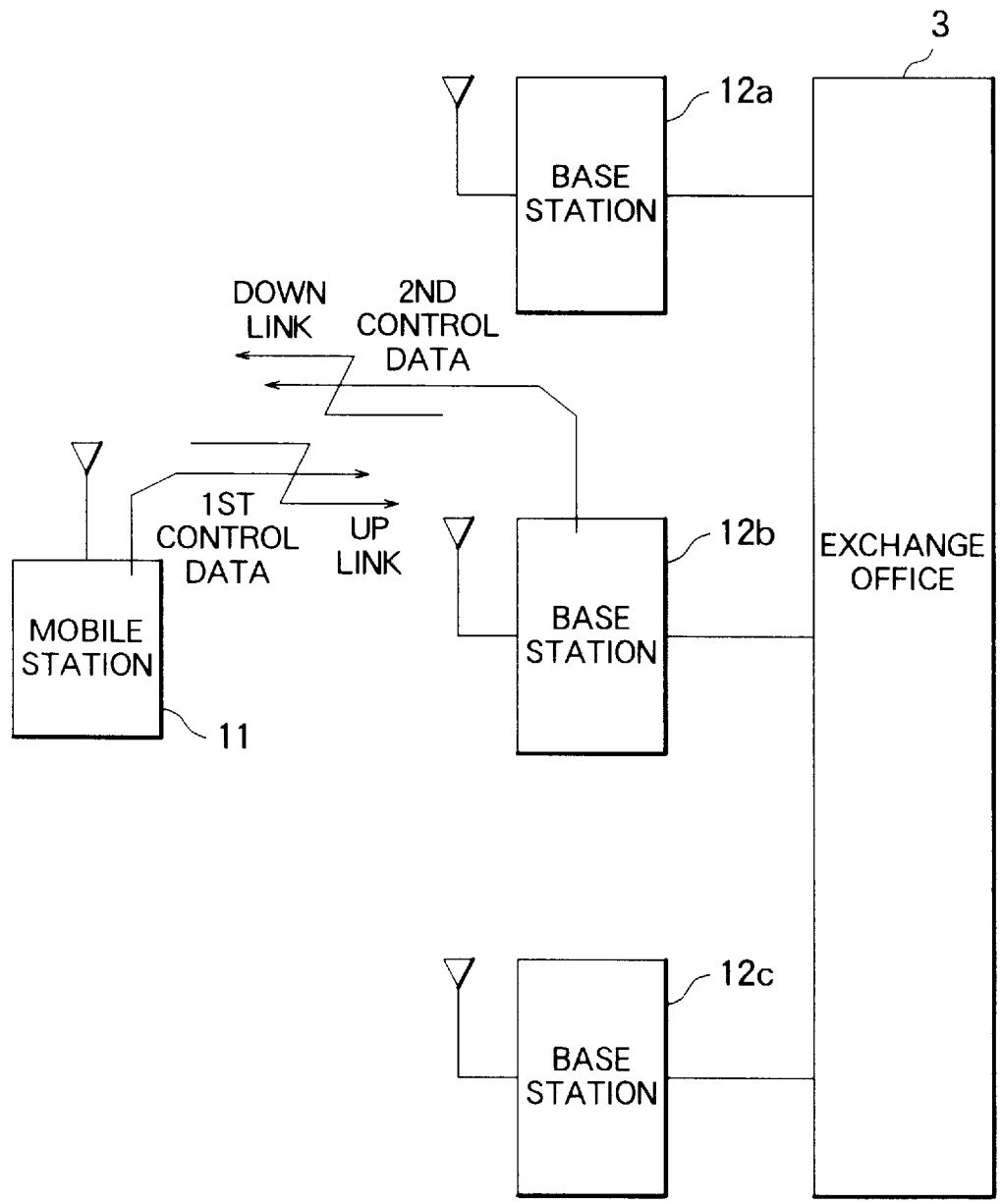
FIG. 2 is a block diagram of a mobile communication system according to a preferred embodiment of this invention.

Referring to FIG. 2, description will proceed to a mobile communication system according to a preferred embodiment of this invention. The illustrated mobile communication system comprises a mobile station 11, first through third base stations 12a to 12c, and the exchange office 3. The mobile station 11 is different in structure from the mobile station 1 illustrated in FIG. 1. Similarly, the first through the third base stations 12a to 12c are different from the first through the third base stations 2a to 2c illustrated in FIG. 1. In the example being illustrated, the mobile station 11 is currently presented in the cell in which the second base station 12b is situated. The mobile station 11 communicates with the second base station 12b by the up link and the down link channel.

Figure 3:
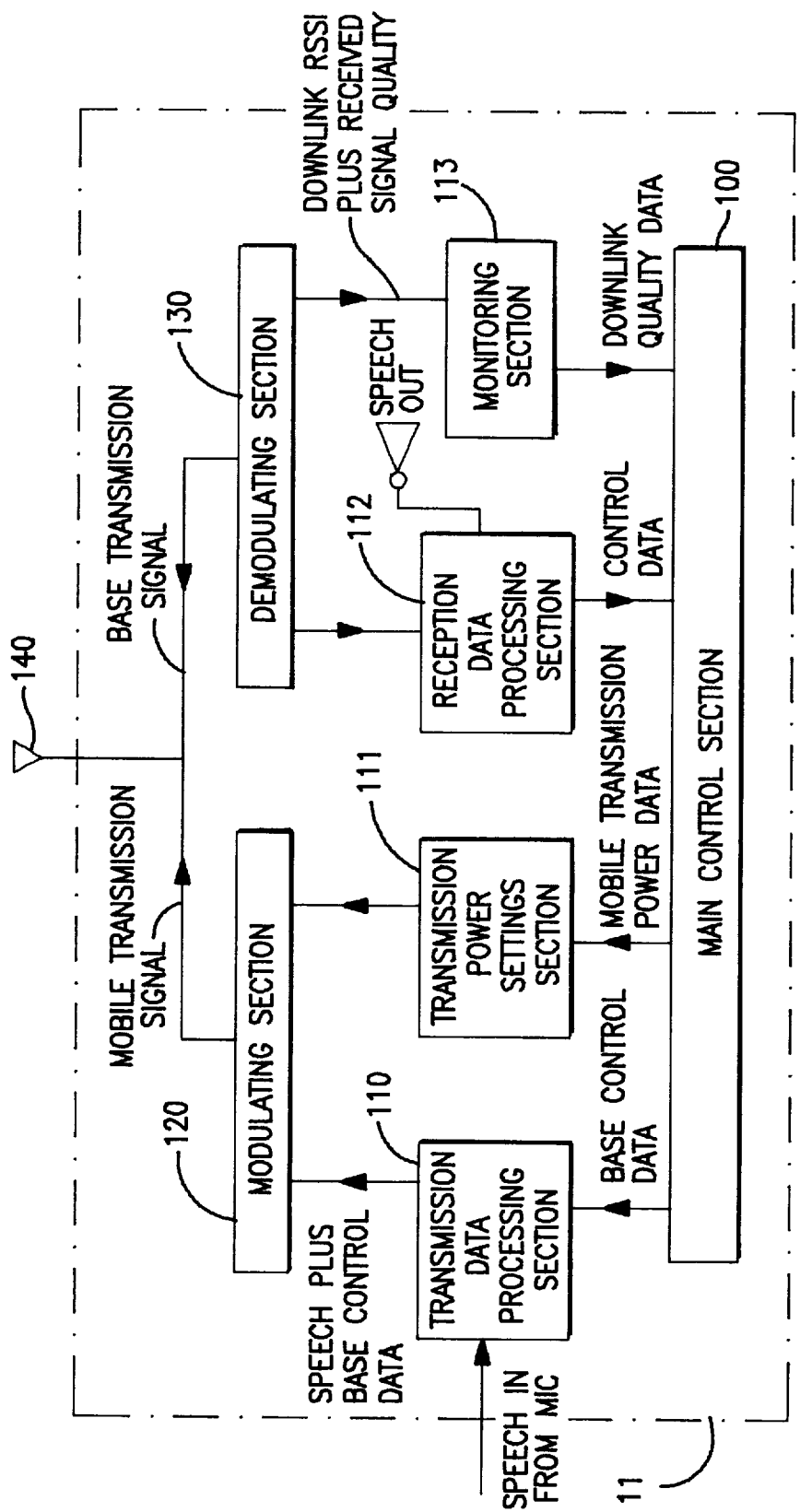
FIG. 3 is a block diagram of a mobile station illustrated in FIG. 2.

Referring to FIG. 3, description will be made as regards the mobile station 11. The mobile station 11 comprises a mobile main control section 100. The mobile station 11 further comprises a mobile transmission data processing section 110, a mobile transmission power setting section 111, a mobile reception data processing section 112, a mobile monitoring section 113, a modulating section 120, and a demodulating section 130, all of which is controlled by the mobile main control section 100.

The mobile transmission data processing section 110 is supplied with a speech signal from a microphone (not shown) to convert the speech signal into a digital speech signal. The mobile main control section 100 may supply a first control data to the mobile transmission data processing section 110. The first control data includes first control information representative of a transmission power of the base station that will be called the base transmission power. The first control information is supplied as a command to the base station 12b as will be described hereinunder. The mobile transmission data processing section 110 multiplexes the speech digital signal and the first control data to produce a mobile multiplexed signal to supply the mobile multiplexed signal to the modulating section 120. The mobile transmission power setting section 111 is controlled by the mobile main control section 100 to supply the modulating section 120 with mobile transmission power information representative of a mobile transmission power. Supplied with the multiplexed signal and the mobile transmission power information, the modulating section 120 modulates the multiplexed signal into a modulated signal to transmits the modulated signal as the mobile transmission signal by the mobile transmission power through a mobile antenna 140.

Figure 4:
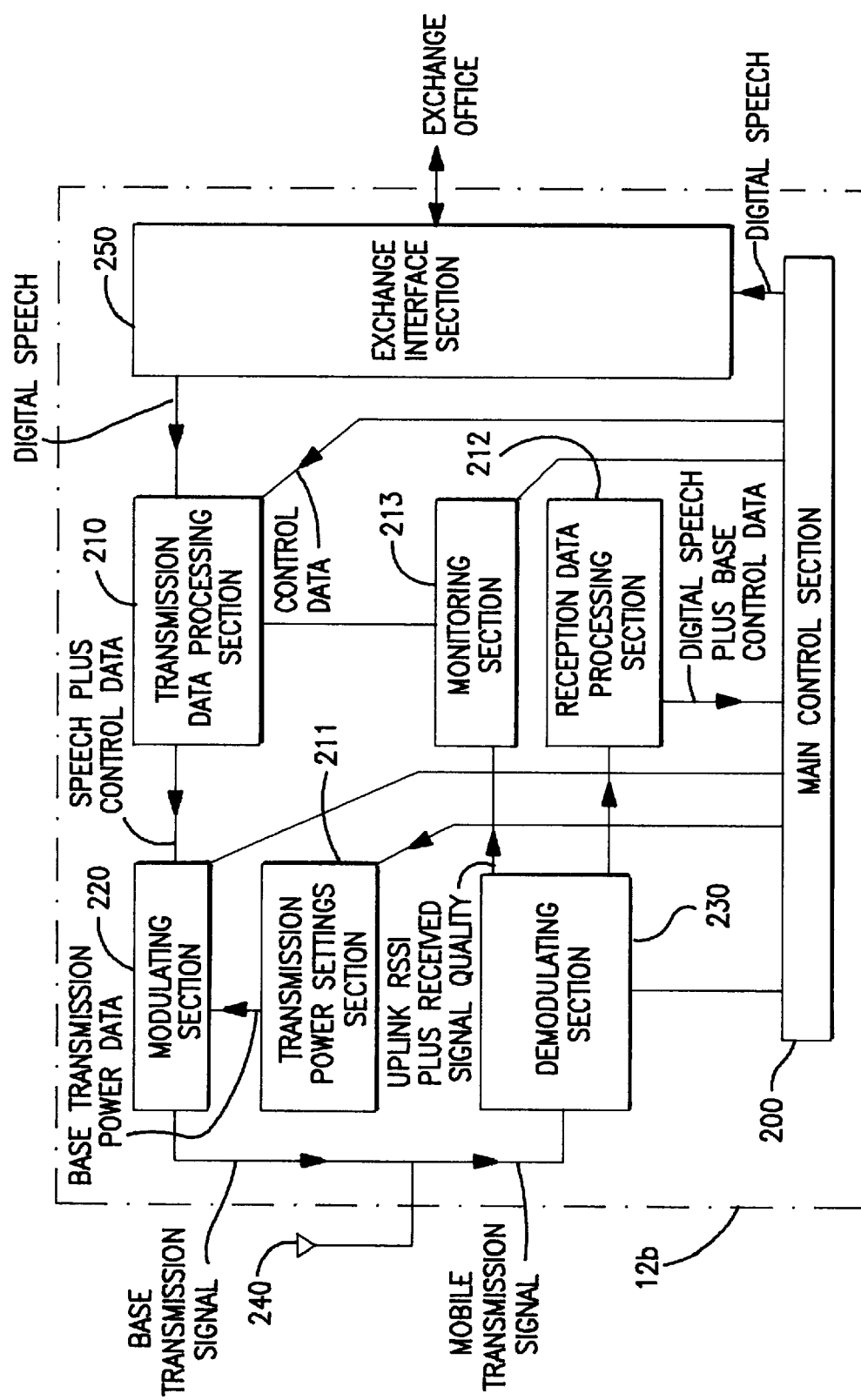
FIG. 4 is a block diagram of a base station illustrated in FIG. 2.

Referring to FIG. 4, description will be made as regards the second base station 12b. Each of the first and the third base stations 12a and 12c is similar in structure to the second base station 12b. Attention will be directed to the second base station 12b. The base station 12b comprises a base main control section 200. The base station 12b further comprises a base transmission data processing section 210, a base transmission power setting section 211, a base reception data processing section 212, a base monitoring section 213, a base modulating section 220, a base demodulating section 230, and an exchange interface section 250, all of which is controlled by the base main control section 200.

The base demodulating section 230 receives the mobile transmission signal as a base reception or received signal through a base antenna 240 to demodulate the base reception signal into a base demodulated signal which is supplied to the base reception data processing section 212. The base reception data processing section 212 produces the digital speech signal and the first control data on the basis of the base demodulated signal. The base reception data processing section 212 supplies the digital speech signal to the exchange interface section 250 which delivers the digital speech signal to the exchange office 3. The base reception data processing section 212 supplies the first control data to the base main control section 200. On demodulation, the base demodulating section 230 measures a received signal strength indicator (received field intensity: RSSI) and a bit error or a word error in accordance with the base reception signal. The received signal strength indicator will be called an up link received signal strength indicator in the base reception signal. The bit error or the word error will be called an up link received signal quality in the base reception signal. The up link received signal strength indicator and the up link received signal quality are supplied to the base monitoring section 213. The base monitoring section 213 monitors the up link received signal strength indicator and the up link received signal quality during a predetermined period under control of the base main control section 200. More particularly, the base monitoring section 213 averages the up link received signal strength indicator during the predetermined period to produce an averaged up link received signal strength indicator. The base monitoring section 213 further averages the up link received signal quality during the predetermined period to produce an averaged up link received signal quality. The averaged up link received signal strength indicator and the averaged up link received signal quality are supplied as an up link quality data to the base main control section 200.

On transmitting the base transmission signal, the base transmission data processing section 210 is supplied with a digital speech signal as a exchange digital speech signal from the exchange office 3 through the exchange interface section 250. The base main control section 200 supplies a second control data to the base transmission data processing section 210. The second control data includes the up link quality data and base transmission power information which is representative of the transmission power of the second base station 12b. The base transmission data processing section 210 multiplexes the exchange digital speech signal and the second control data to produce a base multiplexed signal to supply the base multiplexed signal to the base modulating section 220. The base transmission power setting section 211 is controlled by the base main control section 200 to supply the base modulating section 220 with base transmission power information representative of a base transmission power. Supplied with the base multiplexed signal and the base transmission power information, the base modulating section 220 modulates the base multiplexed signal into a base modulated signal to transmits the base modulated signal as the base transmission signal by the base transmission power through the base antenna 240.

Again referring to FIG. 3, the mobile demodulating section 130 receives the base transmission signal as a mobile reception or received signal through the mobile antenna 140 to demodulate the mobile reception signal into a mobile demodulated signal which is supplied to the mobile reception data processing section 112. The mobile reception data processing section 112 produces the exchange digital speech signal and the second control data on the basis of the mobile demodulated signal. The mobile reception data processing section 112 converts the exchange digital speech signal into an analog speech signal which is supplied to a loud speaker (not shown). The mobile reception data processing section 112 supplies the second control data to the mobile main control section 100. On demodulation, the mobile demodulating section 130 measures a received signal strength indicator (received field intensity: RSSI) and a bit error or a word error in accordance with the mobile reception signal. The received signal strength indicator will be called a down link received signal strength indicator in the mobile reception signal. The bit error or the word error will be called a down link received signal quality. The down link received signal strength indicator and the down link signal quality are supplied to the mobile monitoring section 113. The mobile monitoring section 113 monitors the down link received signal strength indicator and the down link received signal quality during a prescribed period under control of the mobile main control section 200. More particularly, the mobile monitoring section 113 averages the down link received signal strength indicator during the prescribed period to produce an averaged down link received signal strength indicator. The monitoring section 113 further averages the down link received signal quality during the prescribed period to produce an averaged down link received signal quality. The averaged down link received signal strength indicator and the averaged down link received signal quality are supplied as a down link quality data to the mobile control section 100.

Again referring to FIG. 2, the mobile station 11 receives a system data from the base station 12b in synchronism with a control channel (a broadcasting channel) when an electric power is supplied to the mobile station 11. The system data includes first through eleventh information. The first information is representative of a frequency of the control channel (the broadcasting channel) in each of the first and the third base stations 12a and 12c. The second information is representative of a permissible maximum transmission power of the second base station 12b. The third information is representative of a permissible maximum available transmission power of the mobile station 11. The fourth information is representative of a first down link hand-over level for use in determining whether or not it is necessary to carry out a hand-over control on the basis of the down link received signal strength indicator. The fifth information is representative of a second down link hand-over level for use in determining whether or not it is necessary to carry out a hand-over control on the basis of the down link received signal quality. The sixth information is representative of an optimum down link received signal strength indicator and a down link optimum range (upper limit and lower limit) of a down link received signal strength indicator. The seventh information is representative of a down link minimum received signal strength indicator. The eighth information is representative of a first up link hand-over level for use in determining whether or not it is necessary to carry out a hand-over control on the basis of the up link received signal strength indicator. The ninth information is representative of a second up link hand-over level for use in determining whether or not it is necessary to carry out a hand-over control on the basis of the up link received signal quality.

The tenth information is representative of an optimum up link received signal strength indicator and an up link optimum range (upper limit and lower limit) of an up link received signal strength indicator. The eleventh information is representative of the number of idle channels available.

After receiving the system data, the mobile station 11 becomes a state for waiting a call origination by a user or for waiting a paging by the second base station 12b. When a user carries out a call operation in the mobile station 11, the mobile station 11 originates a service demand to the second base station 12b. Responsive to the service demand, the second base station 12b assigns a communication channel to the mobile station 11. After the assignment, the mobile station 11 communicates with the second base station 12b through the communication channel having the up link and down link channel. In the example being illustrated, each of the mobile and the base transmission powers is set to the permissible maximum transmission power at an initial state.

Again referring to FIG. 4, the first control data is supplied to the base main control section 200 in the base station 12b as described above. The base main control section 200 varies the base transmission power into a varied base transmission power in accordance with the first control information when the first control information is representative of a transmission power which is not greater than the maximum transmission power of the base station 12b. The base transmission power setting section 211 is controlled by the base main control section 200 to set the varied base transmission power in the base modulating section 220.

Figure 5:
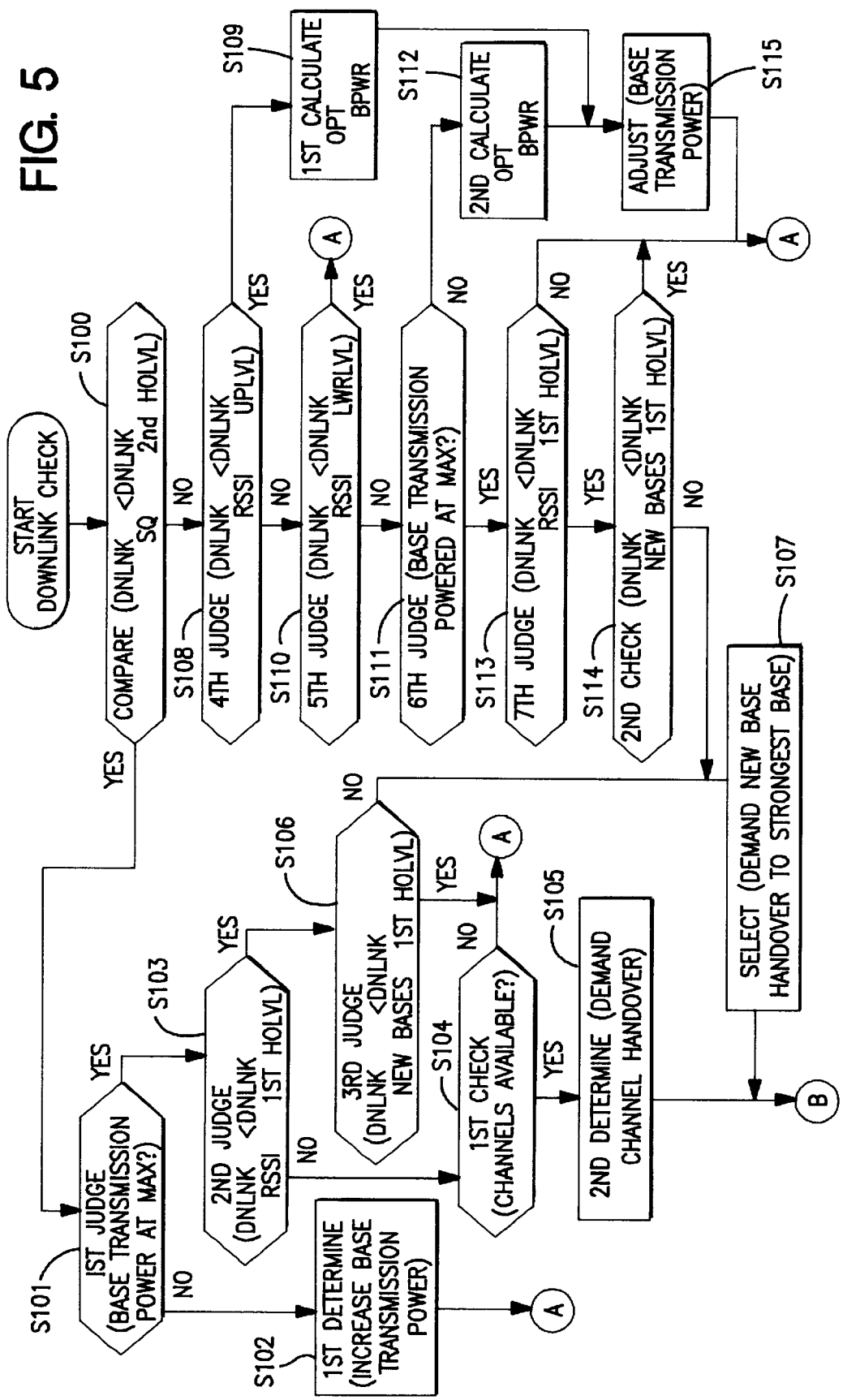
FIG. 5 is a flow chart for describing an operation of the mobile station illustrated in FIG. 3.

Referring to FIG. 5 in addition to FIG. 3, description will proceed to the transmission power control and the hand-over control in the mobile communication system illustrated in FIG. 2. At first, the mobile station 11 carries out a down link check. The mobile main control section 100 compares the down link received signal quality with the second down link hand-over level at a first step S100 labelled "COMPARE" ($DNLNK_{SQ} < DNLNK_{2nd\ HO\ LEVEL}$). When the down link received signal quality is less than the second down link hand-over level at the first step S100, the mobile main control section 100 judges whether or not the base transmission power reaches the permissible maximum transmission power of the base station 12b at a second step S101 labelled "FIRST JUDGE". When the the base transmission power is less than the permissible maximum transmission power at the second step S101, the mobile main control section 100 determines that the base transmission power should be increased for quality improvement of the down link received signal at a third step S102 labelled "FIRST DETERMINE". After the third step S102, operation is directed to a position "A" of FIG. 6 for an up link check.

When the mobile main control section 100 judges that the base transmission power is equal to the maximum transmission power of the base station 12b at the second step S101, the mobile main control section 100 judges whether or not the down link received signal strength indicator is less than the first down link hand-over level at a fourth step S103 labelled "SECOND JUDGE". When the down link received signal strength indicator is not less than the first down link hand-over level at the fourth step S103 ($DNLNK_{RSSI} < DNLNK_{1st\ HO\ LEVEL}$), the mobile main control section 100 checks whether or not an idle channel is available in radio channels at a fifth step S104 labelled "FIRST CHECK". When the idle channel is available to use in the radio channels, the mobile main control section 100 determines to use the idle channel as the communication channel at a sixth step S105 labelled "SECOND DETERMINE". The mobile station 11 demands the hand-over to the base station 12b with information of selected communication channel number. After the sixth step S105, operation is directed to a position "B" of FIG. 6 for the hand-over request. When the idle channel is not available to use at a fifth step S104, operation is directed to the position "A" of FIG. 6 for the up link check.

When the down link received signal strength indicator is less than the first down link hand-over level at the fourth step S103, the mobile main control section 100 makes the mobile monitoring section 113 measure a down link received signal strength indicator of each of first and the third base stations 12a and 12c on the basis of the first information. The mobile main control section 100 judges whether or not the down link received signal strength indicator of each of first and the third base stations 12a and 12c is less than the first down link hand-over level at a seventh step S106 labelled "THIRD JUDGE" for finding available base station for the hand-over ($DNLNK_{RSSI\ NEW\ BASES} < DNLNK_{1st\ HO\ LEVEL}$).

It will be assumed that the down link received signal strength indicator of the first base station 12a is not less than the first down link hand-over level, the mobile station 11 selects the first base station 12a as a hand-over base station at a eighth step S107 labelled "SELECT".

It will be presumed that the down link received signal strength indicator of each of the first and the third base stations 12a and 12c is not less than the first down link hand-over level, the mobile main control section 100 compares the the down link received signal strength indicator of the first base station 12a with the down link received signal strength indicator of the third base station 12c to demand the hand-over to the base station having a higher down link received signal strength indicator. After the eighth step S107, operation is directed to the position "B" of FIG. 6 for the hand-over request with information of selected base station.

When the down link received signal quality is not less than the second down link hand-over level at the first step S100, the mobile main control section 100 judges whether or not the down link received signal strength indicator is greater than the upper level of the down link optimum range ($DNLNK_{UP\ LVL}$) at a ninth step S108 labelled "FOURTH JUDGE". When the down link received signal strength indicator is greater than the upper level of the down link optimum range at the ninth step S108, the mobile main control section 100 calculates an optimum base transmission power in accordance with the present base transmission power, the down link received signal strength indicator and the optimum down link received signal strength indicator at a ten step S109 labelled "FIRST CALCULATE". More particularly, the mobile main control section 100 subtracts the optimum down link received signal strength indicator from the down link received signal strength indicator to obtain a difference down link received signal strength indicator. Furthermore, the mobile main control section 100 subtracts the difference down link received signal strength indicator form the present base transmission power to obtain the optimum base transmission power.

When the down link received signal strength indicator is not greater than the upper level of the down link optimum range at the ninth step S108, the mobile main control section 100 judges whether or not the down link received signal strength indicator is greater than the lower level of the down link optimum range ($DNLNK_{LWR\ LVL}$) at an eleventh step S110 labelled "FIFTH JUDGE". When the the down link received signal strength indicator is greater than the lower level of the down link optimum range at the eleven step S110, operation is directed to the position "A" of FIG. 6 for the up link check.

When the the down link received signal strength indicator is less than the lower level of the down link optimum range at the eleven step S110, the mobile main control section 100 judges whether or not the base transmission power reaches the permissible maximum transmission power of the base station 12b at a twelfth step S111 labelled "SIXTH JUDGE". When the base transmission power is less than the permissible maximum transmission power of the base station 12b at the twelfth step S111, the mobile main control section 100 calculates an optimum base transmission power in accordance with the present base transmission power, the down link received signal strength indicator and the optimum down link received signal strength indicator at a thirteenth step S112 labelled "SECOND CALCULATE". More particularly, the mobile main control section 100 subtracts the down link received signal strength indicator from the optimum down link received signal strength indicator to obtain a difference down link received signal strength indicator. Furthermore, the mobile main control section 100 carries out a sum between the difference down link received signal strength indicator and the present base transmission power to obtain the optimum base transmission power.

When the base transmission power is equal to the permissible maximum transmission power of the base station 12b at the twelfth step S111, the mobile main control section 100 judges whether or not the down link received signal strength indicator is greater than the first down link hand-over level at a fourteenth step S113 labelled "SEVENTH JUDGE". When the down link received signal strength indicator is not less than the first down link hand-over level at the fourteenth step S113, operation is directed to the position "A" of FIG. 6 for the up link check. When the down link received signal strength indicator is less than the first down link hand-over level at the fourteenth step S113, the mobile main control section 100 carries out operation similar to the seventh step S106 at a fifteenth step S114 labelled "SECOND CHECK" in order to find an available base station for the hand-over. When the mobile main control section 100 judges that the hand-over can be carried out, the fifteenth step S114 is followed by the eighth step S107 which is for selecting the hand-over base station. When the mobile main control section 100 judges that the hand-over can not be carried out, the fifteenth step S114 is directed to the position "A".

Each of the tenth and the thirteenth steps S109 and S112 is followed by a sixteenth step S115 labelled "ADJUST". At the sixteenth step S115, the mobile station 11 demands adjustment of the base transmission power to the base station 12b in accordance with the optimum base transmission power.

Figure 6:
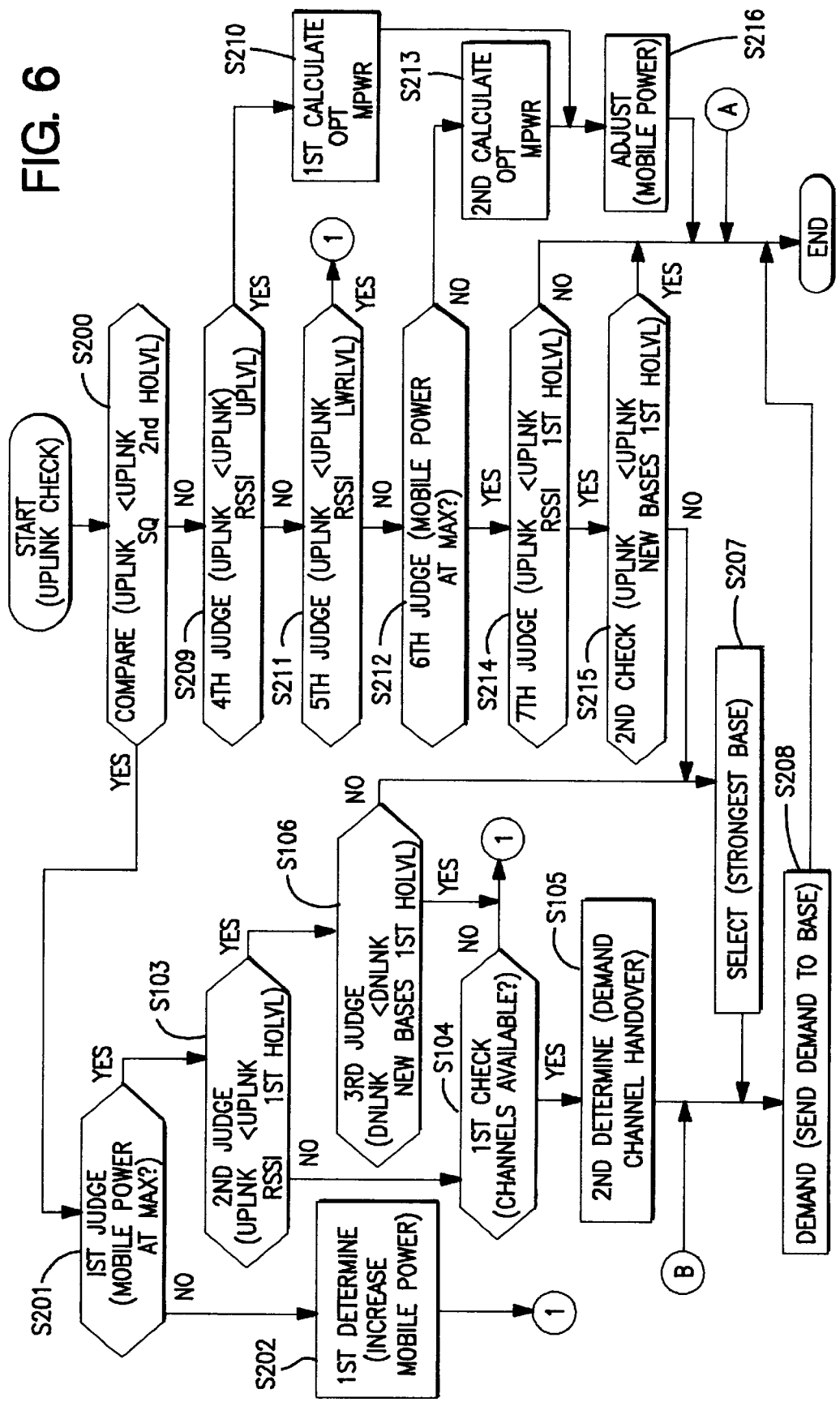
FIG. 6 is a flow chart for describing another operation of the mobile station illustrated in FIG. 3.

Referring to FIG. 6 in addition to FIG. 3, the mobile station 11 may carry out an up link check. The mobile main control section 100 compares the up link received signal quality with the second up link hand-over level at a first step S200 labelled "COMPARE" ($UPLNK_{SQ} < UPLNK_{2nd\ HO\ LEVEL}$). When the up link received signal quality is less than the second up link hand-over level at the first step S200, the mobile main control section 100 judges whether or not the mobile transmission power reaches the permissible maximum transmission power of the mobile station 11 at a second step S201 labelled "FIRST JUDGE". When the mobile transmission power is less than the permissible maximum transmission power at the second step S201, the mobile main control section 100 determines that the mobile transmission power should be increased for quality improvement of the up link received signal at a third step S202 labelled "FIRST DETERMINE". Operation ends after the third step S202.

When the mobile main control section 100 judges that the mobile transmission power is equal to the permissible maximum transmission power of the mobile station 11 at the second step S201, the mobile main control section 100 judges whether or not the up link received signal strength indicator is less than the first up link hand-over level at a fourth step S203 labelled "SECOND JUDGE". When the up link received signal strength indicator is not less than the first up link hand-over level at the fourth step S203 ($UPLNK_{RSSI} < UPLNK_{1st\ HO\ LEVEL}$), the mobile main control section 100 checks whether or not an idle channel is available in radio channels at a fifth step S204 labelled "FIRST CHECK". When the idle channel is available to use in the radio channels, the mobile main control section 100 determines to use the idle channel as the communication channel at a sixth step S205 labelled "SECOND DETERMINE". The sixth step S205 is followed by a ninth step S208. The mobile station 11 demands the hand-over to the base station 12b at the ninth step S208 with information of selected communication channel number.

When the idle channel does is not available to use in the radio channels at the fifth step S204, operation is directed to an end. When the up link received signal strength indicator is less than the first up link hand-over level at the fourth step S203, the mobile main control section 100 receives an up link received signal strength indicator from each of first and the third base stations 12a and 12c on the basis of the first information as described above. The mobile main control section 100 judges whether or not the up link received signal strength indicator from each of first and the third base stations 12a and 12c is less than the first up link hand-over level at a seventh step S206 labelled "THIRD JUDGE" for finding an available base station for hand-over ($UPLNK_{NEW\ BASES} < UPLNK_{1st\ HO\ LEVEL}$).

It will be assumed that the up link received signal strength indicator from the first base station 12a is not less than the first up link hand-over level, the mobile station 11 selects the first base station 12a in order to communicate with the first base station 12a at a eighth step S207 labelled "SELECT".

It will be presumed that the up link received signal strength indicator from each of the first and the third base stations 12a and 12c is not less than the first up link hand-over level, the mobile main control section 100 compares the the up link received signal strength indicator from the first base station 12a with the up link received signal strength indicator from the third base station 12c to select the base station which supplies a higher up link received signal strength indicator to the mobile station 11. After the eighth step S207, operation is directed to a ninth step S208 labelled "DEMAND". In the ninth step S208, the mobile station 11 demands the hand-over to the selected station. Operation is directed to the end after the ninth step S208.

When the up link received signal quality is not less than the second up link hand-over level at the first step S200, the mobile main control section 100 judges whether or not the up link received signal strength indicator is greater than the upper level of the up link optimum range at a tenth step S209 labelled "FOURTH JUDGE" ($UPLNK_{RSSI} < UPLNK_{UP\ LVL}$). When the up link received signal strength indicator is greater than the upper level of the up link optimum range at the tenth step S209, the mobile main control section 100 calculates an optimum mobile transmission power in accordance with the present mobile transmission power, the up link received signal strength indicator and the optimum up link received signal strength indicator at an eleventh step S210 labelled "FIRST CALCULATE". More particularly, the mobile main control section 100 subtracts the optimum up link received signal strength indicator from the up link received signal strength indicator to obtain a difference up link received signal strength indicator. Furthermore, the mobile main control section 100 subtracts the difference up link received signal strength indicator form the present mobile transmission power to obtain the optimum mobile transmission power.

When the up link received signal strength indicator is not greater than the upper level of the up link optimum range at the tenth step S209, the mobile main control section 100 judges whether or not the up link received signal strength indicator is greater than the lower level of the up link optimum range at a twelfth step S211 labelled "FIFTH JUDGE" ($UPLNK_{RSSI} < UPLNK_{LWR\ LVL}$). When the the up link received signal strength indicator is greater than the lower level of the up link optimum range at the twelfth step S211, operation is directed to the end.

When the the up link received signal strength indicator is less than the lower level of the up link optimum range at the twelfth step S211, the mobile main control section 100 judges whether or not the mobile transmission power reaches the permissible maximum transmission power of the mobile station 11 at a thirteenth step S212 labelled "SIXTH JUDGE". When the mobile transmission power is less than the permissible maximum transmission power of the mobile station 11 at the thirteenth step S212, the mobile main control section 100 calculates an optimum mobile transmission power ($OPT_{MPWR}$) in accordance with the present mobile transmission power, the up link received signal strength indicator, and the optimum up link received signal strength indicator at a fourteenth step S213 labelled "SECOND CALCULATE". More particularly, the mobile main control section 100 subtracts the up link received signal strength indicator from the optimum up link received signal strength indicator to obtain a difference up link received signal strength indicator. Furthermore, the mobile main control section 100 carries out a sum between the difference up link received signal strength indicator and the present mobile transmission power to obtain the optimum mobile transmission power.

When the mobile transmission power is equal to the permissible maximum transmission power of the mobile station 11 at the thirteenth step S212, the mobile main control section 100 judges whether or not the up link received signal strength indicator is greater than the first up link hand-over level at a fifteenth step S214 labelled "SEVENTH JUDGE" ($UPLNK_{RSSI} < UPLNK_{1st\ HO\ LVL}$). When the up link received signal strength indicator is not less than the first up link hand-over level at the fifteenth step S214, operation is directed to the end. When the up link received signal strength indicator is less than the first up link hand-over level at the fifteenth step S214, the mobile main control section 100 carries out operation similar to the seventh step S206 at a sixteenth step S215 labelled "SECOND CHECK". When the mobile main control section 100 judges that the hand-over can be carried out, the sixteenth step S215 is followed by the eighth step S207. When the mobile main control section 100 judges that the hand-over can not be carried out, the sixteenth step S215 is directed to the end.

Each of the eleventh and the fourteenth steps S210 and S213 is followed by a seventeenth step S216 labelled "ADJUST". At the seventeenth step S216, the mobile station 11 adjusts the mobile transmission power in accordance with the optimum base transmission power. Operation is directed to the end after the seventeenth step S216.

While this invention has thus far been described in conjunction with the preferred embodiment thereof, it will readily be possible for those skilled in the art to put this invention into practice in various other manners.

What is claimed is:

1. A mobile communication system of a cellular type having a service area divided into a plurality of cells and comprising in each of said cells a base station for carrying out bidirectional communication between said base station and said mobile station, said base station transmitting a base transmission signal to said mobile station at a base transmission power on a bidirectional communication resource, said mobile station transmitting a mobile transmission signal to said base station at a mobile transmission power on a bidirectional communication resource, wherein said base station comprises:

first measuring means for measuring a received signal strength indicator and a received signal quality in accordance with said mobile transmission signal to produce first measured information;

first announcing means for announcing said first measured information and said base transmission power as base announcement information to said mobile station;

first receiving means for receiving mobile announcement information from said mobile station; and first control means for controlling said base transmission power in accordance with said mobile announcement information;

said mobile station comprising:

second measuring means for measuring a received signal strength indicator and a received signal quality as a base received signal strength indicator and a base received signal quality in accordance with said base transmission signal to produce second measured information;

second receiving means for receiving said base announcement information from said base station;

first judging means for judging whether or not it is necessary to carry out a hand-over control in accordance with said second measured information, said base transmission power, and a predetermined hand-over control information, said first judging means further judging whether or not it is necessary for said base station to carry out a base transmission power control in accordance with said second measured information, said base transmission power and a base maximum transmission power to produce a base power control signal when it is necessary for said base station to carry out said base transmission power control;

second judging means for judging whether or not it is necessary to carry out said hand-over control in accordance with said first measured information and said predetermined hand-over control information, said second judging means further judging whether or not it is necessary for said mobile station to carry out a mobile transmission power control in accordance with said first measured information and a mobile maximum transmission power to produce a mobile power control signal when it is necessary for said mobile station to carry out said mobile transmission power control;

second announcing means for announcing said base power control signal as mobile announcement information to said base station; and second control means for controlling said mobile transmission power in accordance with said mobile power control signal.

2. A mobile communication system as claimed in claim 1, wherein said base station further comprises broadcasting means for broadcasting said predetermined hand-over control information representative of up link and down link hand-over levels.

3. A mobile communication system as claimed in claim 2, wherein said broadcasting means further broadcasts base maximum power information and mobile maximum power information, said base maximum power information being representative of a maximum transmission power of said base station, said mobile maximum power information being representative of a maximum transmission power of said mobile station.

4. A mobile communication system as claimed in claim 3, wherein said first judging means comprises:

first means responsive to said second measured information and said predetermined hand-over control information for judging whether or not each of said base received signal strength indicator and said base received signal quality is less than said down link hand-over level to produce a first judgement result signal when each of said base received signal strength indicator and said base received signal quality is less than said down link hand-over level;

second means responsive to said first judgement result signal for judging whether or not said base transmission power is less than said base maximum transmission power to produce a second judgement result signal when said base transmission power is less than said base maximum transmission power; and third means responsive to said second judgement result signal for making said second announcing means announce said mobile announcement information to said base station to increase said base transmission power.

5. A mobile communication system as claimed in claim 3, wherein said first judging means comprises:

first means responsive to said second measured information and said predetermined hand-over control information for judging whether or not each of said base received signal strength indicator and said base received signal quality is less than said down link hand-over level to produce a first judgement result signal when each of said base received signal strength indicator and said base received signal quality is less than said down link hand-over level;

second means responsive to said first judgement result signal for judging whether or not said base transmission power is less than said base maximum transmission power to produce a second judgement result signal when said base transmission power is not less than said base maximum transmission power; and third means responsive to said second judgement result signal for carrying out said hand-over control.

6. A mobile communication system as claimed in claim 3, wherein said first judging means comprises:

first means responsive to said second measured information and said predetermined hand-over control information for judging whether or not each of said base received signal strength indicator and said base received signal quality is less than said down link hand-over level to produce a first judgement result signal when said base received signal quality is less than said down link hand-over level and when said base received signal strength indicator is not less than said down link hand-over level;

second means responsive to said first judgement result signal for judging whether or not said base transmission power is less than said base maximum transmission power to produce a second judgement result signal when said base transmission power is not less than said base maximum transmission power; and third means responsive to said second judgement result signal for selecting another radio channel as a communication channel to communicate with said base station.

7. A mobile communication system as claimed in claim 3, wherein said second judging means comprises:

first means responsive to said first measured information and said predetermined hand-over control information for judging whether or not each of said mobile received signal strength indicator and said mobile received signal quality is less than said up link hand-over level to produce a first judgement result signal when each of said mobile received signal strength indicator and said mobile received signal quality is less than said up link hand-over level;

second means responsive to said first judgement result signal for judging whether or not said mobile transmission power is less than said mobile maximum transmission power to produce a second judgement result signal when said mobile transmission power is less than said mobile maximum transmission power; and third means responsive to said second judgement result signal for making said second control means increase said mobile transmission power.

8. A mobile communication system as claimed in claim 3, wherein said second judging means comprises:

first means responsive to said first measured information and said predetermined hand-over control information for judging whether or not each of said mobile received signal strength indicator and said mobile received signal quality is less than said up link hand-over level to produce a first judgement result signal when each of said mobile received signal strength indicator and said mobile received signal quality is less than said up link hand-over level;

second means responsive to said first judgement result signal for judging whether or not said mobile transmission power is less than said mobile maximum transmission power to produce a second judgement result signal when said mobile transmission power is not less than said mobile maximum transmission power; and third means responsive to said second judgement result signal for carrying out said hand-over control.

9. A mobile communication system as claimed in claim 3, wherein said second judging means comprises:

first means responsive to said first measured information and said predetermined hand-over control information for judging whether or not each of said mobile received signal strength indicator and said mobile received signal quality is less than said up link hand-over level to produce a first judgement result signal when said mobile received signal quality is less than said up link hand-over level and when said mobile received signal strength indicator is not less than said up link hand-over level;

second means responsive to said first judgement result signal for judging whether or not said mobile transmission power is less than said mobile maximum transmission power to produce a second judgement result signal when said mobile transmission power is not less than said mobile maximum transmission power; and third means responsive to said second judgement result signal for selecting another radio channel as a communication channel to communicate with said base station.

10. A cellular communication power and handover control system directed by a mobile unit evaluating system parameters and providing instruction to a base unit, comprising:

a base unit announcer for said base unit announcing to said mobile unit an up link received signal strength indicator, an up link received signal quality, and a current base unit transmission power;

a base unit controller for controlling said base unit transmission power responsive to a base power control instruction from said mobile unit;

mobile unit system parameter evaluation unit for receiving said announced up link received signal strength indicator, said up link received signal quality, and said current base unit transmission power, a down link received signal strength indicator, a down link signal quality, and a current mobile transmission power, said mobile unit system parameter evaluation unit structured and arranged to evaluate:

i) whether to issue a said base power control instruction to said base unit controller by comparing said down link received signal quality to a down link signal quality hand-over point, and by comparing said current base transmission power to a maximum base transmission power;

ii) whether to issue a hand-over command to change bases by comparing said down link received signal quality to a down link signal quality hand-over point, and by comparing said down link received signal strength indicator to a down link received signal strength hand-over point;

iii) whether to issue a mobile power control instruction by comparing said up link received signal quality to an up link signal quality hand-over point, and by comparing said current mobile transmission power to a maximum mobile transmission power; and iv) whether to issue a hand-over command to change channels by comparing said up link received signal quality to an up link signal quality hand-over point, and by comparing said up link received signal strength indicator to an up link received signal strength hand-over point.

11. The system of claim 10, wherein said mobile unit system parameter evaluation unit further evaluates:

v) whether to issue a said hand-over command to change bases by comparing said up link received signal quality to an up link signal quality hand-over point, by comparing said up link received signal strength indicator to an up link received signal strength hand-over point, and by comparing up link received signal strength indicators from additional base units to said up link received signal strength hand-over point.

12. The system of claim 11, wherein said mobile unit system parameter evaluation unit further evaluates:

vi) whether to issue a said hand-over command to change bases by comparing said down link received signal quality to a down link signal quality hand-over point, by comparing said down link received signal strength indicator to a down link received signal strength hand-over point, and by comparing down link received signal strength indicators from additional base units to said down link received signal strength hand-over point.

13. The system of claim 12, wherein said down link signal quality hand-over point, said maximum base transmission power, said down link received signal strength hand-over point, said up link signal quality hand-over point, said maximum mobile transmission power, and said up link received signal strength hand-over point, are transmitted from said base unit to said mobile unit.

* * * * *